United States Patent [19]

Elder

[11] 4,360,232
[45] Nov. 23, 1982

[54] AERODYNAMIC DRAG REDUCTION APPARATUS FOR VEHICLES OR THE LIKE

[76] Inventor: Donald L. Elder, 18557 Vessing Rd., Saratoga, Calif. 95070

[21] Appl. No.: 90,298

[22] Filed: Nov. 5, 1979

[51] Int. Cl.³ .......................................... B62D 35/00
[52] U.S. Cl. ................................................... 296/1 S
[58] Field of Search ...................... 296/1 S, 84 R, 91; 105/2 R, 2 A

[56] References Cited

U.S. PATENT DOCUMENTS

| | | | |
|---|---|---|---|
| 3,952,823 | 4/1976 | Hinderks | 296/1 S X |
| 4,006,931 | 2/1977 | Grover | 296/1 S |
| 4,022,508 | 5/1977 | Kirsch et al. | 296/1 S |
| 4,199,185 | 4/1980 | Woolcock | 296/1 S |

FOREIGN PATENT DOCUMENTS 7507115  12/1975  Netherlands .................. 296/1 S

*Primary Examiner*—Joseph F. Peters, Jr.
*Assistant Examiner*—Ross Weaver
*Attorney, Agent, or Firm*—Paul B. Fihe

[57] ABSTRACT

The invention involves an attachment for bluff forward surface vehicles including a curved inner fairing adjacent one or more rectangular corners of the vehicle together with a spaced air foil member providing high lift characteristics and a convergent path between the members, both to reduce the air resistance and air flow separation from the top and sides of the vehicle, thus to reduce air drag and increase efficiency of operation. If the vehicle corners are more rounded, the inner fairing can be dispensed with and the air foil member merely attached to the vehicle corner in appropriate spaced relation.

7 Claims, 5 Drawing Figures

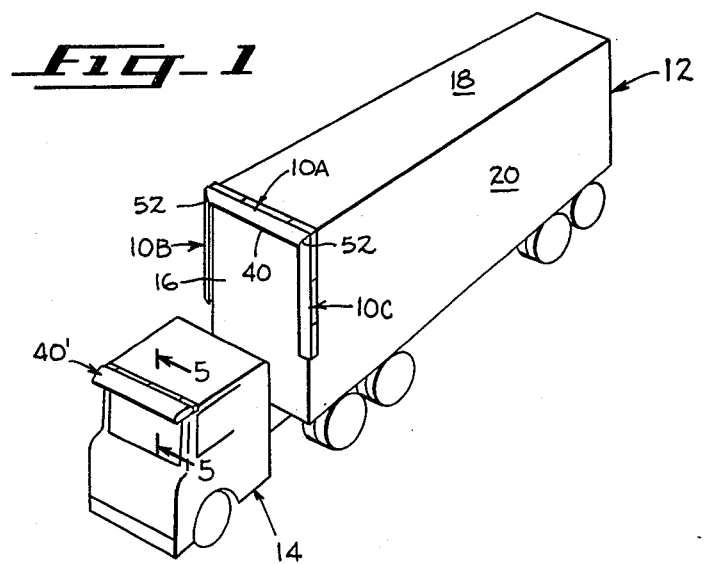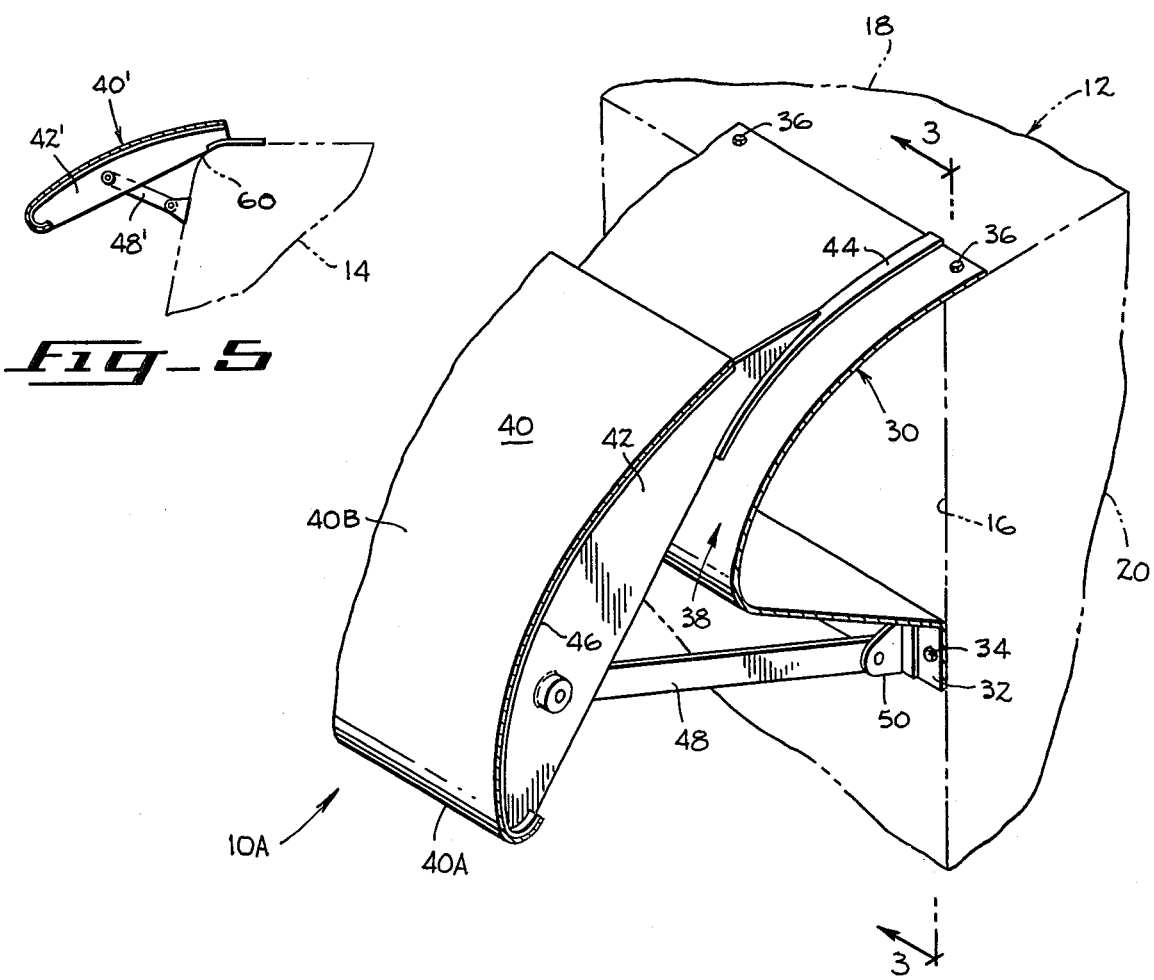

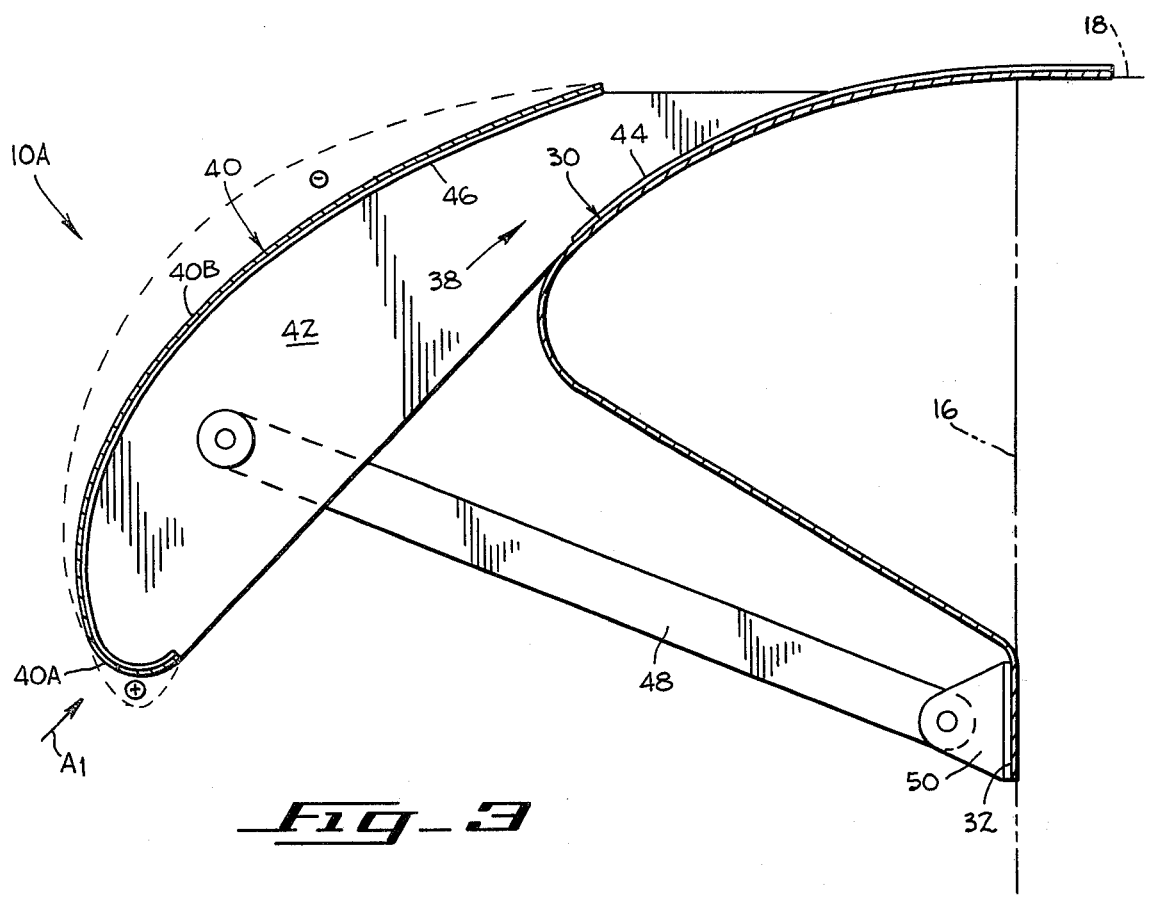
Fig_3
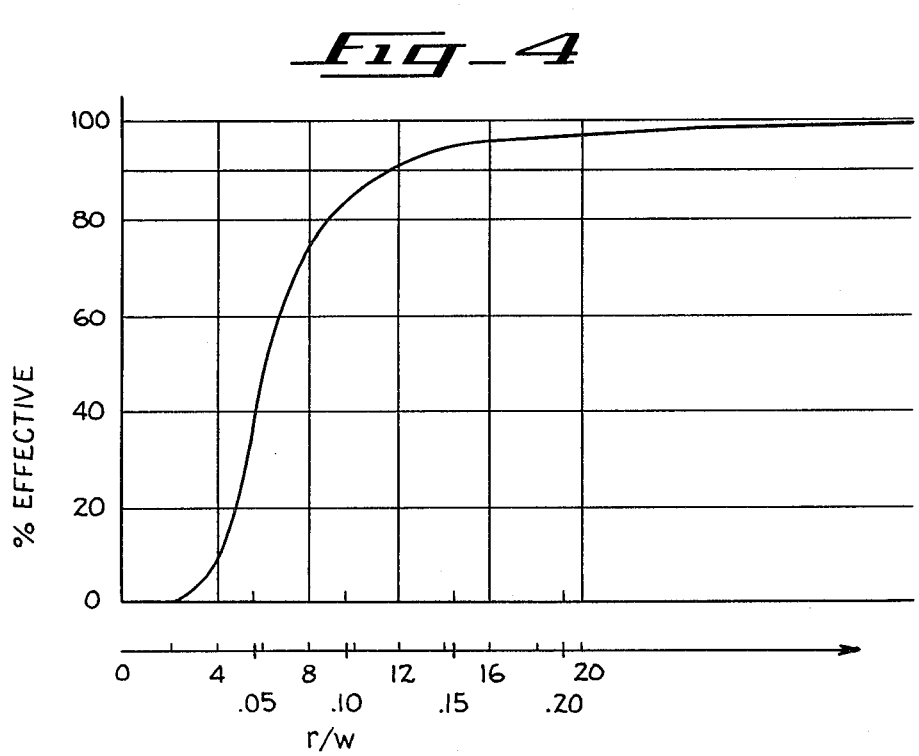
Fig_4

AERODYNAMIC DRAG REDUCTION APPARATUS FOR VEHICLES OR THE LIKE

FIELD OF THE INVENTION

The present invention relates generally to the control of aerodynamic forces and more particularly to an apparatus for reducing the aerodynamic drag on bluff vehicles such as tractor-trailers or the like to improve operating efficiency.

BACKGROUND OF THE INVENTION

It is of course well established that transverse or bluff surfaces on vehicles traveling down a highway provide considerable wind resistance in the form of aerodynamic drag. In particular, the flat bluff surface at the front or windward side of a trailer in a tractor-trailer unit provides considerable area exposed to aerodynamic forces occasioned by the travel of the vehicle on a highway at typical speeds in the range of fifty to sixty miles per hour, it being well known that such drag forces increase as the square of the speed. Typically, decreased efficiency of twenty percent or more occurs, and fuel use and cost, in turn, is increased a significant amount.

Recently, when fuel costs have themselves increased by substantial amounts, this problem has received considerable attention and attempts have been made to decrease the aerodynamic drag to reduce fuel costs and provide generally higher efficiency in the operation for a given cargo load. While it is known that generally curving the corners adjacent the bluff forward surface of a trailer will reduce the aerodynamic drag, a dilemma occurs since such curving of corner edges reduces cargo capacity. As a consequence, specific attempts have been made to provide attachments for the existing maximum cargo, generally rectangular boxlike configurations of the trailer so that the same may be retained yet enable reduction of aerodynamic drag and the attendant inefficiency of operation. However, such attempts have been in general but partially effective, due primarily to a limited understanding of aerodynamic forces.

SUMMARY OF THE PRESENT INVENTION

Accordingly, it is the general objective of the present invention to provide apparatus for reducing the aerodynamic drag on bluff vehicles such as tractor-trailers or any other structure exposed to aerodynamic forces in a more sophisticated manner, and to provide also fuel savings and other attendant advantages without, however, necessitating the reduction in effective cargo-carrying space. This general objective, while primarily applicable to cargo-carrying trucks or trailers, will be also applicable to passenger cars, vans, campers, recreational vehicles, railrood cars, and other mobile vehicles, and even to static structures which are subjected to high winds, such as buildings, billboards, highway signs and drive-in movie screens; and as a consequence, it will be understood by those skilled in the art that the structure and principles to be described hereinafter, particularly with regard to trucks and trailers, can also be applied to these alternative structures and environments with corresponding advantage.

Briefly, the drag reduction apparatus, to achieve this general objective, is applied to the generally rectangular corner edges adjoining a bluff surface. For exampe, the trailer in a tractor-trailer combination normally has a forward bluff surface extending transversely to the direction of motion, typically eight feet in width and ten or more feet in height, so as to provide a considerable area exposed to the wind resistance or aerodynamic drag.

At each rectangular edge, the apparatus includes a curved inner fairing beginning at a point spaced inwardly from the edge and extending to a position substantially tangential to the edge of the surface adjoining the bluff surface.

As an additional element of the apparatus, an air foil member is held in spaced relation from the fairing so as to form therebetween a channel which converges outwardly from an inner position to a position adjacent the top or lateral sides of the trailer, or to similar positions on other structures. Because of the mentioned convergence, a jet of increased velocity air is generated and is directed at an angle of approximately twenty degrees from the exit slot between the fairing and the air foil member, which effectively reduces separation of the air from the top or lateral sides of the trailer.

The air foil member itself is designed in accordance with aerodynamic principles, having a nose portion of relatively small radius directed generally towards the flow of air, which is diverted somewhat outwardly by the bluff surface. From this small radius nose portion, the major portion of the air foil member extends angularly rearwardly along a surface having an increasingly larger radius of curvature so that it in effect forms a high-lift air foil so that the negative pressures exerted theragainst counteract the positive pressures and effect substantial reduction in the aerodynamic drag. To provide maximum effectiveness, the air foil member terminates at a position below the exterior countours of the top or lateral sides of the trailer, and more precisely beyond the position of maximum lift or negative air pressure. In practice, this would mean that the total angular extent of the air foil member is something less than sixty degrees, and usually, for a trailer having the mentioned dimensions of eight feet by ten feet, would amount to a total arc of approximately forty degrees. This effects maximum lift with a minimal structure, and also provides for appropriate exhaust of the previously mentioned jet of air between the air foil member and the fairing at the required approximately twenty degree angle to maximize effective thrust and minimize air separation from the top or sides of the trailer.

As will be implied from the foregoing, no modification of the trailer itself is necessary and the described drag reducing unit can be secured thereto by a simple bolting operation, and requires but a minimal weight structure yet achieves its general purpose of reducing aerodynamic drag in a highly efficient manner.

It should be mentioned that if, for certain installations wherein the tractor, trailer, or other vehicle has a rounded corner but of inadequate radius, the fairing itself may be eliminated and the air foil member can be mounted itself adjacent thereto to provide the same functional characteristics of providing a high-lift structure which reduces the total positive forces against the vehicle and at the same time provides the required angular jet of air to reduce air separation along the top or sides of the trailer.

BRIEF DESCRIPTION OF THE DRAWINGS

The stated objective of the invention and the manner in which it is achieved as summarized hereinabove will be more fully understood by reference to the following detailed description of the structure shown in the accompanying drawings wherein:

FIG. 1 is a perspective view of a tractor-trailer combination with drag reducing apparatus embodying the present invention mounted on the top and side edges of the trailer itself, and in a modified form on the tractor, FIG. 2 is a greatly enlarged fragmentary perspective view illustrating details of the drag reducing apparatus and its mounting on the trailer unit, FIG. 3 is an enlarged transverse sectional view taken along line 3—3 of FIG. 2, illustrating additional details of construction and the functional aerodynamic relationships achieved thereby, FIG. 4 is a graph indicating the operational efficiencies of the described structure, and FIG. 5 is an enlarged sectional view taken along line 5—5 of FIG. 1, showing details of the modified arrangement on the tractor.

DETAILED DESCRIPTION OF THE EXEMPLARY EMBODIMENT OF THE INVENTION

With initial reference to FIG. 1, three units 10A, 10B and 10C have been applied to the top and side edges of the forward portion of a trailer 12 connected to a powered tractor 14 in a substantially conventional fashion. As will be apparent, the tractor portion 14 of the unit will deflect engaged air upwardly over the top thereof and laterally to the sides thereof, and as a consequence, the side elements 10B and 10C of the apparatus need extend downwardly along the lateral edges of the trailer only to a position slightly below the top of the tractor itself.

As illustrated, the trailer portion 12 of the tractor-trailer unit has a forward bluff surface 16 extending transversely to the direction of vhicle motion for approximately eight feet in width and ten feet in height. This forward bluff surface 16 is joined substantially rectangularly to a top surface 18 and side surfaces 20 in a conventional fashion, thus to provide maximum cargo space within the trailer. Further details of the tractor and trailer are not described since they are of standard construction and configuration.

With additional reference to FIGS. 2 and 3, the precise configuration of the aerodynamic drag reduction apparatus 10A embodying the present invention is disclosed relative to the top of the trailer 12, but it will be understood that the two side elements 10B and 10C are of substantially equivalent configuration so that the following description relating to FIGS. 2 and 3 and to the transverse top drag reduction unit 10A is applicable to all three units.

As best shown in FIGS. 2 and 3, the upper or top unit 10A includes a fairing 30 having a lowermost flange member 32 arranged to rest against the flat surface of the forward bluff surface 16 of the trailer 12, enabling bolts or machine screws 34 to be applied to secure the same to such surface at a position spaced inwardly from its outer or top edge. The fairing 30 can be formed from sheet metal, plastic, or other sheet material, and from such flange portion 32 extends angularly outwardly and forwardly in the direction of vehicle motion for a predetermined distance, and then curves reversely with a relatively large radius of curvature greater than four inches rearwardly so as to terminate above the top surface of the trailer just to the rear of its top corner edge, where bolts or screws 36 are again applied to secure the entire structure in the illustrated disposition.

This curved fairing 30 forms one side of a convergent air channel indicated at 38, the other side of which is formed by an air foil member 40 that is supported in spaced relationship from the fairing 30 by a series of ribs 42 which contact and are secured to straps 44, secured to the described fairing at lateral intervals and by similar straps 46 to the interior of the air foil member 40 through any suitable connection such as welding or other means, depending upon the composition of the two units. The air foil member 40 is also secured adjacent its forward extremity by a series of laterally spaced braces 48, secured at one end by brackets 50 on the flange portions 32 of the fairing 30, and to the described ribs 42 at positions closely adjacent the forward extremity of the air foil member 40. More particularly, the support is such that the air foil member is generally angled downwardly and forwardly at an inclination such that the existent air flow as diverted by the bluff surface 16 impinges at the forward extremity of the air foil member 40 in substantial alignment with its angular disposition, as shown best in FIG. 3. More particularly, the air foil member 40 has a rounded nose 40A having a relatively small radius of curvature (e.g., two inch radius) directed generally against the flow of incoming air as indicated by the arrow $A_1$ in FIG. 3, and terminating at one end inwardly a short distance from the nose and extending rearwardly in the opposite direction in spaced convergent relationship with the fairing 30 so that the mentioned convergent channel 38 is formed. To provide for high lift, the air foil member 40 has a major lift portion 40B adjoining the small radius nose portion 40A, having an increasing radius of curvature approaching twenty inches so as to provide a high-lift structure as indicated by the increased negative pressure shown by dotted lines in FIG. 3, as opposed to the positive pressure against the nose portion of the air foil member, also as indicated in the same figure. At the position where negative pressure has substantially dropped below its maximum, it is terminated to form one edge of the exit slot of the convergent channel 38 described hereinbefore, such position being generally such that the outgoing flow of air through the channel at an accelerated velocity because of its convergent nature lies at an angle of approximately twenty degrees relative to the top surface 18 of the trailer, and thus results in maximally effective thrust and substantial zero separation of the flowing air along the top surface of the trailer 12.

A similar arrangement provided by the units 10B and 10C along the lateral or side surfaces of the trailer 12 will provide a similar reduction in separation of air flow from these lateral sides, thus to reduce the drag on the entire trailer or other vehicle, as the case may be. In each case, the ends of the units 10A, 10B or 10C are closed by end plates 52.

It should be particularly noted that the negative pressure or high lift exerted by the air foil configuration reduces the total positive resistance or drag on the trailer 12 and allows the reduction in total drag in accordance with the general objective of the present invention; and this, being added to the reduction in air separation at the top or sides of the trailer, provides ultimately for the increased efficiency in general operation and fuel economy in accordance with the inventor's principles.

As has been mentioned, the pressures against the apparatus have been generally described and designated in FIG. 3, and this, in combination with the accelerated jet of air exhausted at approximately a twenty degree angle between the air foil member 40 and the fairing 30, provides for a considerable reduction in drag. Experiments have shown, as illustrated in the graph of FIG. 4, that an increased radius of curvature above 0.12 in terms of radius values as compared to overall width of a unit result in drag reduction effectiveness approximating ninety percent, and with the essentially twenty inch radius of the described air foil member 40 as illustrated, on a trailer having a width of eight feet and a vertical dimension which is slightly greater, a reduction in drag approaching ninety-seven percent is achieved, although it will be understood that high values in excess of eighty-five percent reduction in drag are achieved with a described structure having a radius no greater than twelve inches for this particular trailer configuration. As a consequence, if the radii of curvatures are more than one-eighth of the lateral dimensions of the bluff surface, a very effective reduction in aerodynamic drag is achieved with an arrangement which is both light, simple to install, and relatively inexpensive.

If a rounded corner with a radius of curvature greater than four inches exists, the fairing 30 can be eliminated, and as an example, reference is specifically made to FIG. 5, which shows the rounded top corner 60 of the tractor 14 to which an air foil member 40' is secured by suitable braces 48' and ribs 42' so as to provide a corresponding highlift structure, including a convergent channel, so that the general effect of drag reduction is indeed similar to the previously described embodiment of the invention.

It will be obvious that further modifications can be made for various applications, and as a consequence, the foregoing description of two exemplary embodiments as applied to conventional trailers or tractors can be made without departing from the spirit of the invention and accordingly the foregoing description is not to be considered in a limiting sense, and the actual scope of the invention is to be indicated only by reference to the appended claims.

What is claimed is:

1. Apparatus for reducing aerodynamic drag on bluff vehicles or the like having rectangular edges, which comprises
    a curved inner fairing extending forwardly from the bluff surface of the vehicle and substantially merging with the rectangularly-related, rearwardly extending surface thereof, and
    an air foil member supported in spaced relation forwardly of said fairing in the direction of vehicle travel to provide a rearwardly convergent air flow channel between said fairing and said air foil member,
    said air foil member having a major curvature radius at least one-eighth of the transverse dimension of the bluff surface of the vehicle.

2. Apparatus for reducing aerodynamic drag according to claim 1 wherein
    said air foil member has a forwardly and downwardly directed nose portion of small radius and a major lift portion of increasing radius toward the rearward portion thereof.

3. Apparatus for reducing aerodynamic drag according to claim 1 wherein
    said air foil member has a total angular extent of less than sixty degrees.

4. Apparatus for reducing aerodynamic drag according to claim 1 wherein
    said air foil member has a terminal edge beyond the position of maximal negative pressure thereon.

5. Apparatus for reducing aerodynamic drag according to claim 1 wherein
    said fairing and said air foil member form an exit opening providing for air exhaust at an angle of approximately twenty degrees relative to the lateral surface of the vehicle.

6. Apparatus for reducing aerodynamic drag according to claim 1 which comprises
    end plates connecting and closing the ends of said conjoined fairing and air foil member.

7. Apparatus for reducing aerodynamic drag on a vehicle having a bluff surface and rounded corner edges which comprises a vehicle fairing,
    an air foil member supported in spaced relation forwardly of the vehicle fairing in the direction of vehicle motion and forming therebetween a convergent air flow channel, said air foil member having a rounded front nose portion of relatively small radius and a rearwardly extending surface of increasing radius, at least one eighth of the transverse dimension of the bluff surface.

* * * * *